United States Patent [19]

Adell

[11] 4,434,598
[45] Mar. 6, 1984

[54] DECORATIVE MOLDINGS

[75] Inventor: Robert Adell, Novi, Mich.

[73] Assignee: U.S. Product Development Company, Sunnyvale, Tex.

[21] Appl. No.: 323,511

[22] Filed: Nov. 23, 1981

[51] Int. Cl.³ .................. E04F 19/02; B60R 13/02
[52] U.S. Cl. ................................................. 52/716
[58] Field of Search ............... 52/717, 716, 281, 242, 52/288, 466, 718; 49/462

[56] References Cited

U.S. PATENT DOCUMENTS

| | | | |
|---|---|---|---|
| 3,392,498 | 7/1968 | Rogers | 52/716 X |
| 3,547,515 | 12/1970 | Shanok et al. | 52/716 X |
| 3,591,996 | 7/1971 | Shanok et al. | 52/716 |
| 3,770,545 | 11/1973 | Jackson | 52/716 X |
| 4,028,856 | 6/1977 | Dalbec | 52/717 X |
| 4,379,377 | 4/1983 | Adell | 52/716 X |

Primary Examiner—J. Karl Bell
Attorney, Agent, or Firm—Stephenson & Boller

[57] ABSTRACT

Decorative trim for use such as a body side molding on an automotive vehicle comprises a metal strip with a vinyl insulation applied to one side of the strip. Beads are formed along the longitudinal margins of the strip by turning them inwardly from the main body of the molding so that when applied to the body of an automotive vehicle the main body of the molding is set outwardly from the vehicle body. The formation of the beads stiffens the metal and the beads are disposed against the body of the sheet metal. Various attachment procedures may be used including adhesive between the beads and the vehicle, and the use of mechanical fasteners is also possible.

12 Claims, 11 Drawing Figures

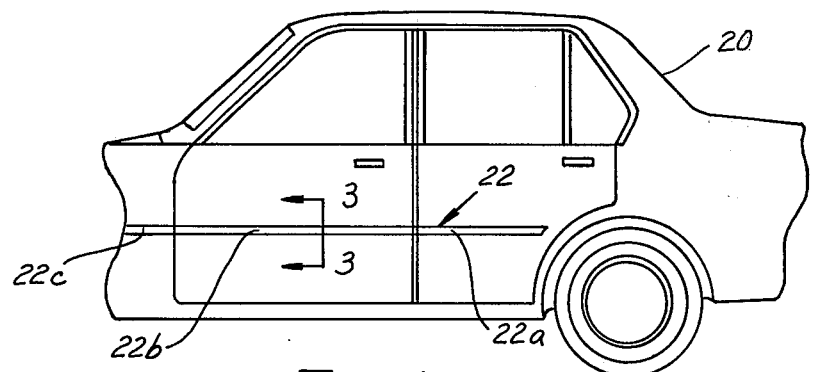
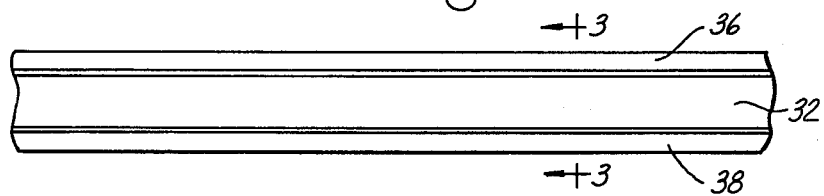
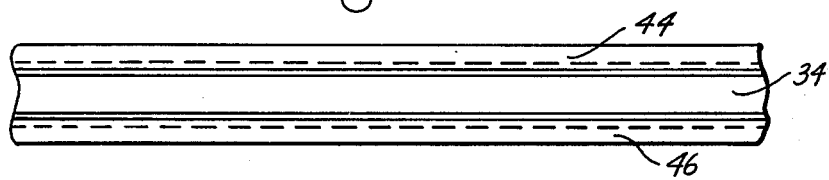
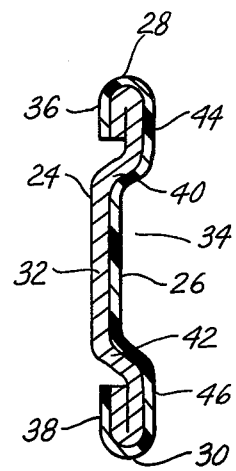
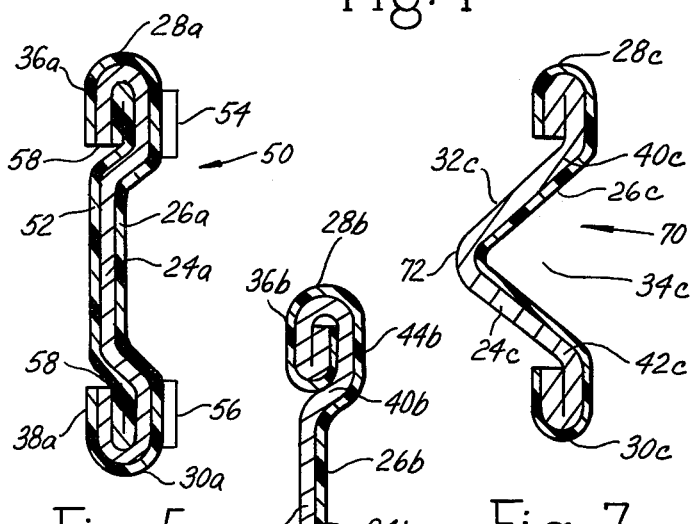
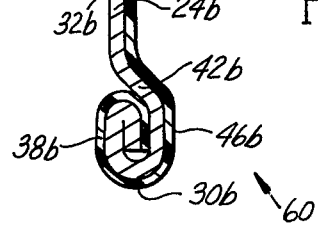
Fig. 1
Fig. 2
Fig. 3
Fig. 4
Fig. 5
Fig. 6
Fig. 7

DECORATIVE MOLDINGS

BACKGROUND AND SUMMARY OF THE INVENTION

This invention relates generally to decorative moldings and is specifically concerned with decorative trim moldings which may be used as body moldings in automotive vehicles.

Decorative trim moldings are applied to vehicle bodies for the purpose of enhancing the appearance of the vehicle. They may be applied to the body sheet metal not only for appearance purposes but also for protective purposes as well. One type of molding used on vehicle bodies is referred to as a body side molding. It is applied to the sides of the vehicle's body, such as the fenders, doors, and/or quarter panels.

In the past such trim moldings have been made from various materials. For example, early usage involved bright metal, such as chrome plated steel. These moldings were fastened to the body by means of conventional fasteners such as metal clips, screws and the like. With the increased availability of plastic materials, the usage of plastic trim moldings increased significantly. While plastics are generally lighter in weight than their metal counterparts and while they may have in the past been less expensive than metal moldings, plastics possess certain undesirable characteristics. For example, plastic is subject to cracking or chipping and is not nearly as strong or durable as a metal molding. While procedures such as sputtering can be used to impart a metallic looking appearance to a piece of plastic, the appearance is certainly not that of a true bright metal piece. Furthermore the very dramatic increase in the price of raw plastic over recent years has made plastic molding pieces considerably more expensive than they once were.

In general, plastic body side moldings must have a solid cross section of plastic. If attempts are made to reduce the amount of plastic used for a given outward appearance, then the part either becomes weaker or additional complications are introduced into the fabrication of the parts.

In attempts to reduce manufacturing costs while improving upon product quality automobile manufacturers have attempted to use plastic body side moldings which are mounted on a vehicle simply through the use of adhesive cement. In other words there are no separate mechanical fasteners which used to mount the molding to the body metal. These attempts have not been completely successful. One of the problems which is encountered involves curvature and/or irregularities in the vehicle body contour. In order for a plastic molding to have any chance of being successfully applied to the side of the body by means of an adhesive cement or glue it is necessary for the mating surfaces of the molding and the body to be in close conformity. In actual practice this is a very difficult task to achieve on a mass production basis. The adhesive attachment technique is limited by the characteristics of the available adhesives and cements. Generally an adhesive or cement processes only a certain amount of holding force per unit area. In order to provide an adquate surface area between the molding and the body it often becomes necessary for the molding to be made larger in cross sectional area because of the limitations of the adhesive or cement. This means that the molding must be larger in width than might other wise be desired and it also can mean that additional material has to be used in the cross section.

The use of mechanical fasteners is considered less desirable for the reason that it involves the punching of holes in the body members and it increases the number of parts involved as well as the labor required to assemble the fasteners to each hole. Hence although the mechanical fastening technique is acceptable in many instances, it is certainly not as desirable a procedure.

A still further problem with the adhesive fastening technique occurs over the life of the vehicle. Vehicles are subjected to road shock and vibration which impart vibration and distortion to the sheet metal. There are also imparted to the attachment between the trim element and the body and tend to weaken the attachment. Hence in the case of adhesive fastening, these factors can lead to premature separation of the trim piece from the body. A still further problem involves environmental considerations. In the warmer climates such as Los Angeles and the Southern California basin, the exposure to prolonged heat, salt air, high humidity, ozone and ultra-violet radiation tends to attack the adhesives presently known to the industry. The washing of a vehicle with extremely hot water such as used in an auto wash rack and the use of steam in the vicinity, such as is applied to the cleaning of the wheels and wheel wells, can attack the adhesives, intruding between the edge of the molding and the body of the vehicle. While these factors may not immediately cause separation of the trim moldings from the vehicle, they can lead to premature separation. Even in the colder climates problems can occur. For example, water may collect on the top edge of a molding and intrude between the molding and the body. The freezing, thawing, and refreezing can lead to premature separation of the molding from the body. Furthermore the use of road salts, as in Michigan and other regions of the country, can attack the adhesive causing premature separation.

It is further often desired for moldings to be more than simply a metal piece having a strictly metallic appearance throughout its exposed exterior. As examples, it may be desired for moldings to have borders or particular geometrical configurations. These can lead to more complicated fabrication procedure for a molding.

Where metal is used in a molding, there is the potential for electrochemical corrosive action to be initiated if the molding and body metals are dissimilar and come into contact.

The present invention is directed to a new and improved molding which is well suited for use as a trim molding on vehicles bodies such as a body side molding. The present invention overcomes the disadvantages of prior moldings referred to above. One important advantage of the invention is that it is primarily a metallic molding thereby exibiting the desirable strength characteristics of metal moldings; yet at the same time the molding is insulated from the sheet metal body of the vehicle so that problems relating to the use of metal moldings are avoided. Another advantage is that the invention may be practiced in a wide variety of cross-sectional shapes thereby providing a myriad of different appearances for edge moldings; yet, it spite of this versatility, the cross-sectional area and hence amount of material in the cross-section can be minimized while, the outward appearance of the molding would suggest a much more substantial amount of material in the cross-section. The invention also enhances the appearance of a molding without complicating the fabrication procedure because inherent decorative features are imparted to the molding through the manufacturing process. Hence extra manufacturing procedures to include the additional complementary appearance features are not essential. Moreover, the molding of the invention may be attached to the body through any of a number of possible installation procedures. For one it is possible to use adhesives or cements. The invention is more readily conformable to contours and irregularities in the vehicle body and thus better suited for adhesive attachment. Alternative procedures may be used by inclusion of separate adhesive fastening strips; for example adhesive-backed foam or tape, and mechanical plastic fasteners may also be used with certain configurations of the molding. The molding need not have a metallic looking appearance and it is contemplated that various materials may be laminated to the exterior of the molding so as to provide other than metalic appearance if desired. When this is done, less expensive grades of metal may be used thereby minimizing the cost to the consumer.

The body side molding of the present invention comprises a strip of metal to one side of which is applied a layer of insulating material. In the finished molding this insulating material is disposed over the obverse side of the molding so as to insulate the metal of the molding from the vehicle body. The longitudinal edges of the molding are provided with stiffening beads by turning the marginal longitudinal edges over onto the face, or exterior, of the molding. By making the insulating layer cover the full width of the obverse side of the metal strip, the formation of the stiffening beads results in decorative bands of insulation appearing on the exterior face of the molding running along the longitudinal edges. The beads are set inwardly from the rest of the main body of the molding and it is along these inset marginal edges where the attachment of the molding to the vehicle body may take place. For example adhesive may be applied to the obverse side of beads to attach the molding to the vehicle body. Because these edges are spaced apart and because the main body of the molding is outwardly offset relative to the beads a better conformity of the molding to the body can take place. By setting the main body of the molding outwardly, a more substantial outward appearance is also presented to an observer yet the interior of the molding when mounted on a body is essentially a dead air space. Hence, it will be recognized that a lesser amount of material is required in the cross section.

The particular manner in which the beads are formed is susceptible to a number of possibilities. For example, one way to form the beads is by a single 180° reversal of the marginal edges. Alternatively a multiple number of reversals may be employed to build up the thickness of the molding at the beads. Furthermore the reversals may have different orientations depending upon the particular shape of the molding. For one the reversals to form the beads can be made at the ends of inwardly turned flanges which are formed in the main body of the molding. The head of a fastener, preferably plastic, can be lodged in the interior of the molding with diametrically opposite sides of the head of the fastener engaging the respective flanges to retain the molding on the vehicle body with the shanks of the fasteners passing through suitable apertures in the sheet metal body panels. The degree of visibility of the beads will also be a function of the particular construction. In some moldings the beads may be highly prominent while in others, less prominent. These various possibilities contribute to the versatility of the invention as far as being suitable for various molding configurations. The molding is fabricated by conventional roll forming techniques after the insulating layer has been applied to the metal. Where a metallic exterior appearance is not desired, fabrication can be done by laminating a further layer of material to the face of the strip before roll forming. After roll forming the metal is basically fully enclosed by the two layers. By appropriate selection of colors for the layers, various decorative possibilities occur.

The foregoing features, advantages and benefits of the invention, along with additional ones will be seen in the ensuing description and the claims which should be considered in conjunction with the accompanying drawings. The drawings disclose a preferred embodiment of the invention according to the best mode contemplated at the present time for carrying out the invention.

BRIEF DESCRIPTION OF THE DRAWINGS

FIG. 1 is a partial side elevational view of an automobile containing a molding embodying principles of the invention.

FIG. 2 is an enlarged fragmentary view of the molding of FIG. 1 shown by itself and looking in the same direction as the view of FIG. 1.

FIG. 3 is an enlarged cross-sectional view taken in the direction of arrows 3—3 in FIG. 2.

FIG. 4 is a view of the opposite side of FIG. 2.

FIG. 5 is a cross-sectional view similar to FIG. 3 showing a second embodiment.

FIG. 6 is a cross-sectional view similar to FIG. 3 showing a third embodiment.

FIG. 7 is a cross-sectional view similar to FIG. 3 showing a fourth embodiment.

DESCRIPTION OF THE PREFERRED EMBODIMENT

Figure 8:
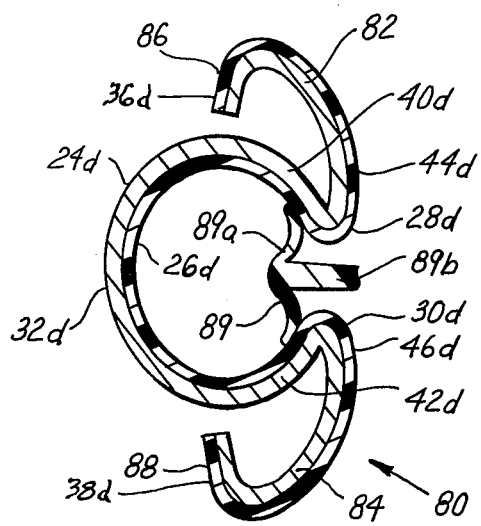
FIG. 8 is a cross-sectional view similar to FIG. 3 illustrating a fifth embodiment.

FIG. 1 shows an automobile 20 containing a body side molding 22 embodying principles of the invention. The body side molding appears as a continuous decorative strip from a distance; however, in actuality it comprises individual pieces each of which is attached to a corresponding sheet metal panel of the body. For example the portion 22a is attached to the rear door, the portion 22b to the front door, and the portion 22c to the fender.

Details of the molding are shown in FIGS. 2, 3 and 4. The molding 22 comprises a metal molding element 24 and a insulating element 26. This preferred embodiment has the metal molding element 24 formed from a strip of bright decorative metal with the insulating layer 26 being a vinyl, or other suitable plastic, which has been applied to the metal strip 24 before the strip is formed to the cross sectional shape illustrated in FIG. 3.

The insulating element is a layer applied in full surface-to-surface contact across the full extent of the side of the strip which becomes the obverse side of the molding when installed on the vehicle. Accordingly it will be perceived that the metal strip and insulating layer constitute a laminated structure having a generally rectangular cross-sectional shape before forming.

In accordance with fabrication of the molding pursuant to the principles of the invention, the longitudinal marginal edges of the laminated structure are formed into insulated metal beads 28 and 30. The insulated metal beads are set inwardly (i.e., to the right as viewed in FIG. 3) relative to the main body portion of the molding which is designated by the general reference numeral 32. In other words the main body portion 32 is set outwardly so as to provide what will become a dead air space 34 on the interior of the molding when it is applied to the vehicle in the manner hereinafter described.

The formation of the beads 28 and 30 in the embodiment of FIG. 3 is accomplished by turning the marginal edges of the laminated strip and insulating layer 180° onto the face side of the molding. In this way the insulating layer forms decorative bands 36 and 38 respectively on the face side of the molding which present a pleasing contrast to the bright metal constituting the remainder of the exterior face surface of the molding. In this regard the insulating layer may be a drak colored vinyl such as black, brown, or navy. Furthermore, the beads are fully closed so that there is metal-to-metal contact resulting in a double metal thickness at the bead which is covered on both sides by insulating material. Hence, the body side molding comprises insulated metal beads running the full length of the molding along the longitudinal edges thereof and providing an attractive appearance as well as the functional attributes of insulating the metal of the strip 24 from the body and stiffening the molding. The cross section provided by the metal beads, and including the offsetting segments 40 and 42 which respectively connect the beads 28 and 30 to the main body portion 32, provide a strength to the molding strip which allows the use of thinner gage metals thereby increasing the yield per pound of metal and saving the consumer money. Moreover, the cross-section provides advantages insofar as mounting on the vehicle are concerned.

The inward offsets of the beads 28 and 30 allow for adhesive to be applied to the beads along the obverse sides thereof as indicated at 44 and 46 respectively. The adhesive is used to secure the molding along its marginal edges to the side of the body. This provides an attachment along transversely spaced, longitudinally extending locations and it means that the molding can be conformed to the typical contours which are encountered in the design of automobiles and it also overcomes the impediments which might otherwise be caused by irregularities in the body contour. Furthermore, because the attachment is at spaced locations a better resistance to separation due to vibration or irregularities is achieved over what would be anticipated were the molding strip to have a strictly flat surface which is intended to be in essentially surface-to-surface contact along the full width of the obverse side of the molding.

Thus the invention possesses advantages from a number of different standpoints including appearance, function, cost, and versatility.

FIG. 4 illustrates a second embodiment of edge guard designated by the general reference numeral 50. It should be readily apparent from comparison with FIG. 3 that the second embodiment 50 has a basically similar shape. Hence, it will not be described in full detail. Corresponding portions of the edge guard 50 are identified by the same base numeral as in FIG. 3 but with the inclusion of the suffix a.

In addition to the metal molding 24a and the insulating layer 26a the embodiment 50 includes an outer layer 52 which is applied to the surface of the strip opposite the surface to which insulating layer 26a is applied. The new layer 52 is applied prior to roll forming so that a three layer laminated construction results. When the beads 28a, 30a are formed, the longitudinal marginal edges of the layer 52 are folded back onto themselves so that the two metal thicknesses are not in metal-to-metal contact. Furthermore, the inclusion of the second layer 52 results in the metal being essentially entirely concealed from view except along the edges 58. Hence the material of layer 52 may be of a decorative character so that a non-metallic appearance of the molding results. This allows less expensive metal to be used for the metal element 24a. Layer 52 may be a vinyl applied to the molding in exactly the same manner as the layer 26a. It may be of the same color as the layer 26a or it may be of a complementary color if desired.

An additional feature shown in FIG. 5 involves the use of adhesive backed attachment strips 54 and 56 respectively. These are applied to the obverse sides of the beads 28a, 30a. These may be a double back adhesive, one side of which is adhered to the molding bead and the other side of which is also adhesive for attachment to the vehicle body. The strips 54, 56 could be applied to the molding at the time of fabrication with the exposed surface being covered by a release paper which is stripped at the time that the molding is to be applied to the vehicle. The materials of the strips may be of any suitable character, for example a foam strip may be well-suited and this can provide a certain shock-absorbing capabiity in the mounting of the molding on the vehicle body as well as providing a seal for the dead air space 34. The resiliency can also be useful in compensating for irregularities in the body sheet metal.

FIG. 6 illustrates a third embodiment of molding 60. The molding is once again basically the same as that of FIG. 3 and corresponding portions are identified by the same base numeral but with the inclusion of the suffix b. In the FIG. 6 embodiment the basic difference involves the details of the beads 28b, 30b. Rather than being a single reversal as in the FIG. 3 embodiment, the beads 28b and 30b are a double reversal whereby each bead has three thicknesses of metal and three thicknesses of insulation. Triple metal thickness provides further rigidity to the molding and it also brings the decorative band 36b, 38b over a portion of the offsets 40b and 42b. While the embodiment 60 is not shown to include an outer layer such as 52 in FIG. 5 it is certainly possible to include such an outer layer if desired. In such an instance the resultant construction would fully enclose the metal so that the side edges of the metal strip as indicated at 58 in FIG. 5 would not have any possibility of being seen by an observer. The attachment procedure for the embodiment of FIG. 6 may be either through the direct application of adhesive to the beads as in FIG. 3 or through the use of adhesive strip elements as in FIG. 5.

FIG. 7 shows a fourth embodiment 70 in which corresponding portions are identified by the same base numeral as in the previous figures but with the suffix c. The main body portion 32c has a pointed appearance in cross section with the main body being straight continuations from the respective offset segments 40c, 42c with a bend 72 at the center. The protruding appearance of this embodiment creates an impression of a more substantial cross section yet the amount of material is essentially the same as in other embodiments. It is only the dead air space which is increased. As in the earlier embodiments an outer layer such as the layer 52 could be included on the FIG. 7 embodiment and it would also be possible to have a double reversal of each bead as in the FIG. 6 embodiment. Either attachment technique could be used.

The remaining embodiments shown in FIGS. 8 through 11 inclusive are shown to utilize a mechanical attachment to the body. This would represent an alternative attachment method if desired. The availability of alternate attachment methods and the further embodiments demonstrate the versatility which is possible with the invention. The embodiment shown in FIG. 8 is designated by the reference numeral 80 and its constituent portions are reference by the same base reference numeral as in the earlier embodiments but with the suffix d. The main body 32d is a circularly contoured section which may be considered as extending about three-quarters of a full circle. The offsets 40d, 42d are inherent in the manner in which the main body is contoured. The beads 28d, 30d have a rather different shape and orientation from the previously illustrated shapes of the earlier embodiments. The beads 28d, 30d are formed as inwardly directed flanges in juxta position across the throat or opening into the interior of the molding. The points at which the molding bears against the vehicle body are indicated by the reference numerals 44d and 46d. There is also a further continuation of each bead away from the portions 44d, 46d; these continuations are designated by the reference numerals 82 and 84 respectively. In the FIG. 8 embodiment the continuations are spaced outwardly from the main body portion 32d but include inwardly turned marginal edges 86 and 88 respectively arranged as to have the bands of insulation 36d, 38d readily visible when viewed in the direction of FIG. 1.

The attachment involves the use of a plurality of mechanical fasteners 89 at spaced locations along the length of the molding. Preferably these fasteners are plastic elements having heads 89a and shanks 89b. Diametrically opposite sides of the head engage the flanges constituting the beads, and the shanks 89b engage suitable apertures in the vehicle body for mounting. The fasteners may be pre-assembled into the body and the molding may be snapped on over the exposed heads of the fasteners. The molding of FIG. 8 could alternatively by attached by other procedures if desired, and also if desired it could include a second layer on the opposite surface from that to which layer 26d has been applied.

Figure 9:
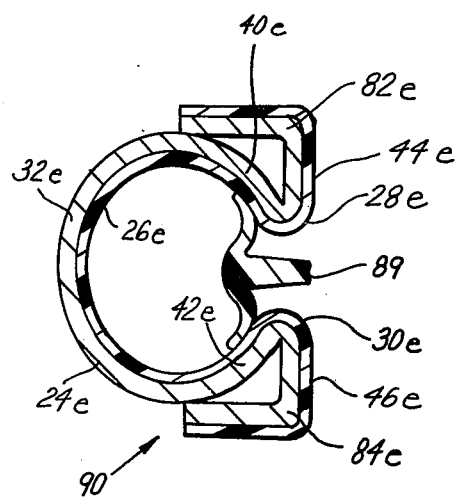
FIG. 9 is a cross-sectional view similar to FIG. 3 illustrating a sixth embodiment.

FIG. 9 illustrates still another embodiment 90 which is generally similar to FIG. 8 and which corresponding portions are identified by the same base numeral but with the inclusion of a suffix e. The continuations 82e and 84e have different shapes from their counterparts in FIG. 8. The exposed insulation in this embodiment is less prominent when viewed in the direction of FIG. 1 than is the case with the preceding embodiments. However, when viewed from inclinations the decorative bands are more readily seen.

Figure 10:
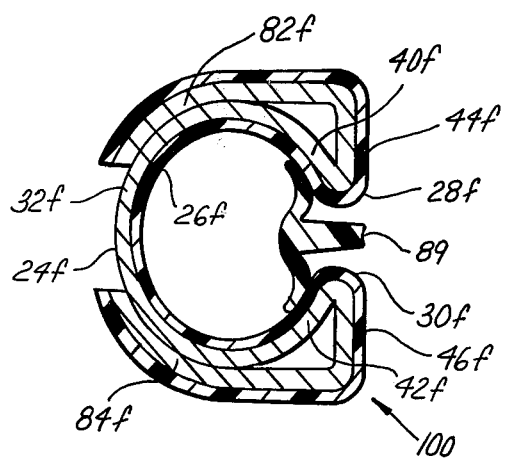
FIG. 10 is a cross-sectional view similar to FIG. 3 illustrating a seventh embodiment.

FIG. 10 is a further embodiment designated by the reference numeral 100. Corresponding portions are identified by the same base reference numeral but with the inclusion of the suffix f. This embodiment is basically identical to the FIG. 9 embodiment except that the continuations of the beads extend further to include curled portions wrapped around the circularly contoured main body portion.

Figure 11:
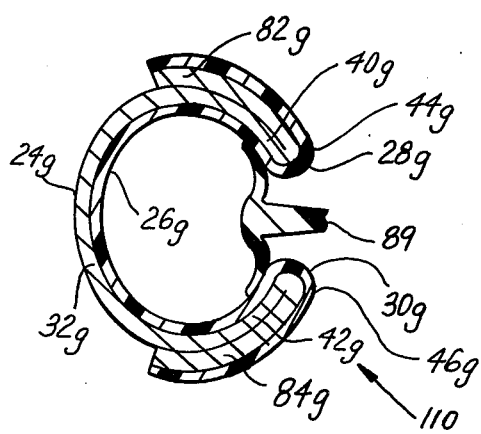
FIG. 11 is a cross-sectional view similar to FIG. 3 illustrating an eighth embodiment.

FIG. 11 is a still further embodiment designated by the reference numeral 110. Corresponding portions are identified by the same base reference numeral but with the inclusion of the suffix g. In this embodiment the beads are fully closed and directly against the outside of the curved main body portion.

In all embodiments the second layer on the exterior surface of the metal may be included or omitted as desired. Likewise the various attachment techniques may be used independently or in conjunction with each other. Because of the numerous variations which are possible in cross-sectional shape it can be seen that the invention provides a great versatility for design purposes yet while still accomplishing functional benefits on an economically manufactured basis. All body side moldings may be formed by conventional forming techniques such as roll forming in particular. In this regard reference is made to applicant's co-pending application Ser. No. 323,513, now U.S. Pat. No. 4,319,377, issued Apr. 12, 1983, for a preferred manufacturing procedure which may be used with the moldings disclosed herein. The moldings may be decorated as desired and provide attractive finished appearances. They possess the strength and durability advantages of metal but without many of the disadvantages of metal due to the inclusion of the insulation and the particular formation of the cross-sectional shape in accordance with generic principles of the invention.

What is claimed is:

1. In combination with a vehicle body panel, a decorative molding disposed against said vehicle body panel comprising a metal strip containing insulating layer on one side including the longitudinal margins and being formed into a cross-sectional shape having a main body between the longitudinal margins and in which the longitudinal margins are formed into longitudinally extending insulated beads by the margins being turned onto the side of the metal strip opposite the side containing the insulating layer and with the insulated beads being set inwardly in relation to the main body, said insulated beads having insulated faces disposed against said vehicle body panel with said main body being set outwardly from said vehicle body panel to provide a void being said main body and said vehicle body panel, said insulated faces being disposed in a common plane when viewed in cross-section through the molding, and means for attaching said molding to said vehicle body panel via said beads such that the metal of said strip remains insulated from said vehicle body panel.

2. A decorative molding as claimed in claim 1 wherein the beads are formed at the edges of the longitudinal margins of the strip.

3. A molding as set forth in claim 2 in which the beads are formed as a single reversal of the edges of the longitudinal margins of the strip.

4. A decorative molding as set forth in claim 3 wherein the beads are formed as multiple reversals of the edges of the strip.

5. A decorative molding as claimed in claim 1 wherein the beads are formed in portions of the longitudinal margins spaced inwardly from the edges of the strip.

6. A decorative molding as set forth in claim 1 including a further layer on the side of the metal strip opposite the side containing the insulation layer.

7. A decorative molding as set forth in claim 1 including adhesive applied to the beads on the obverse side of the molding.

8. A decorative molding as set forth in claim 1 including adhesive strips applied to the beads on the obverse side of the molding.

9. A decorative molding as set forth in claim 1 wherein the beads are formed as flanges of the molding.

10. A decorative molding as set forth in claim 9 including mechanical fasteners engaging the flanges for attaching the molding.

11. A decorative molding as set forth in claim 5 including continuations of the beads extending from the point at which the beads will bear against an object when installed thereon and with the continuations being visible on the exterior of the molding.

12. A decorative molding as set forth in claim 1 and including a body panel against which said insulated faces of said beads are disposed.

* * * * *

UNITED STATES PATENT AND TRADEMARK OFFICE
CERTIFICATE OF CORRECTION

PATENT NO. : 4,434,598
DATED : March 6, 1984
INVENTOR(S) : Robert Adell

It is certified that error appears in the above-identified patent and that said Letters Patent is hereby corrected as shown below:

Column 8, line 46, "being" should read --between--.

Column 10, cancel claim 12.

On the title page, "12 Claims" should read --11 Claims--.

Signed and Sealed this

Seventh Day of August 1984

[SEAL]

Attest:

GERALD J. MOSSINGHOFF

Attesting Officer

Commissioner of Patents and Trademarks